US012581160B1

(12) United States Patent
Belhakimi et al.

(10) Patent No.: US 12,581,160 B1
(45) Date of Patent: Mar. 17, 2026

(54) SYSTEMS AND METHODS FOR FRAMING VIDEOS

(71) Applicant: GoPro, Inc., San Mateo, CA (US)

(72) Inventors: Amine Belhakimi, San Mateo, CA (US); Mejed El Jabri, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 94 days.

(21) Appl. No.: 18/609,535

(22) Filed: Mar. 19, 2024

(51) Int. Cl.
| | |
|---|---|
| *H04N 21/4402* | (2011.01) |
| *G06T 7/70* | (2017.01) |
| *H04N 5/262* | (2006.01) |
| *H04N 23/611* | (2023.01) |
| *H04N 23/698* | (2023.01) |

(52) U.S. Cl.
CPC ........... *H04N 21/4402* (2013.01); *G06T 7/70* (2017.01); *H04N 5/2628* (2013.01); *H04N 23/611* (2023.01); *H04N 23/698* (2023.01)

(58) Field of Classification Search
CPC ............. H04N 21/4402; H04N 5/2628; H04N 23/611; H04N 23/698; G06T 7/70
See application file for complete search history.

(56) References Cited

U.S. PATENT DOCUMENTS

| | | | | |
|---|---|---|---|---|
| 10,643,303 | B1 * | 5/2020 | Cotoros | H04N 23/90 |
| 10,742,882 | B1 * | 8/2020 | Oulès | H04N 23/698 |
| 10,970,602 | B1 * | 4/2021 | Cunningham | G06F 18/2431 |
| 10,992,880 | B1 * | 4/2021 | Stimm | H04N 5/2628 |
| 11,115,451 | B2 * | 9/2021 | Wang | H04N 21/4728 |
| 11,532,128 | B2 * | 12/2022 | Wang | G06T 15/20 |
| 2019/0208124 | A1 * | 7/2019 | Newman | G06T 7/194 |
| 2020/0045286 | A1 * | 2/2020 | Boyce | H04N 21/2353 |
| 2020/0084428 | A1 * | 3/2020 | Oh | H04N 19/46 |
| 2020/0366842 | A1 * | 11/2020 | Oulès | H04N 23/698 |
| 2022/0086339 | A1 * | 3/2022 | Tran | G11B 27/031 |

* cited by examiner

*Primary Examiner* — John R Schnurr
(74) *Attorney, Agent, or Firm* — Esplin & Associates, PC

(57) ABSTRACT

Framing options of different types may be determined for various moments in the video based on one or more aspects of the video. The aspects of the video may include capture aspects of the video (e.g., how the image capture device moved during capture of the video) and/or content aspects (e.g., what is captured/depicted within the video) of the video. The video may be framed by automatically switching between different framing options based on a priority matrix. The values of the priority matrix may be set/updated based on user data to provide views of the video that are customized for the user. The framing options selected for the video may be used to select which moments of the video are included in the framed video (e.g., video edit with the framed views, video playback with the framed views). The present disclosure may be used to automatically determine which spatial extents and which temporal parts of the video are included in the framed video.

15 Claims, 8 Drawing Sheets

METHOD 200

201
Obtain video information defining a video, the video having a progress length.

202
Determine framing options of different types for the video as a function of progress through the progress length of the video.

203
Select one or more of the framing options to frame the video at different moments within the progress length of the video.

204
Determine framing of the video for presentation based on the selected framing option(s).

System 10

METHOD 200

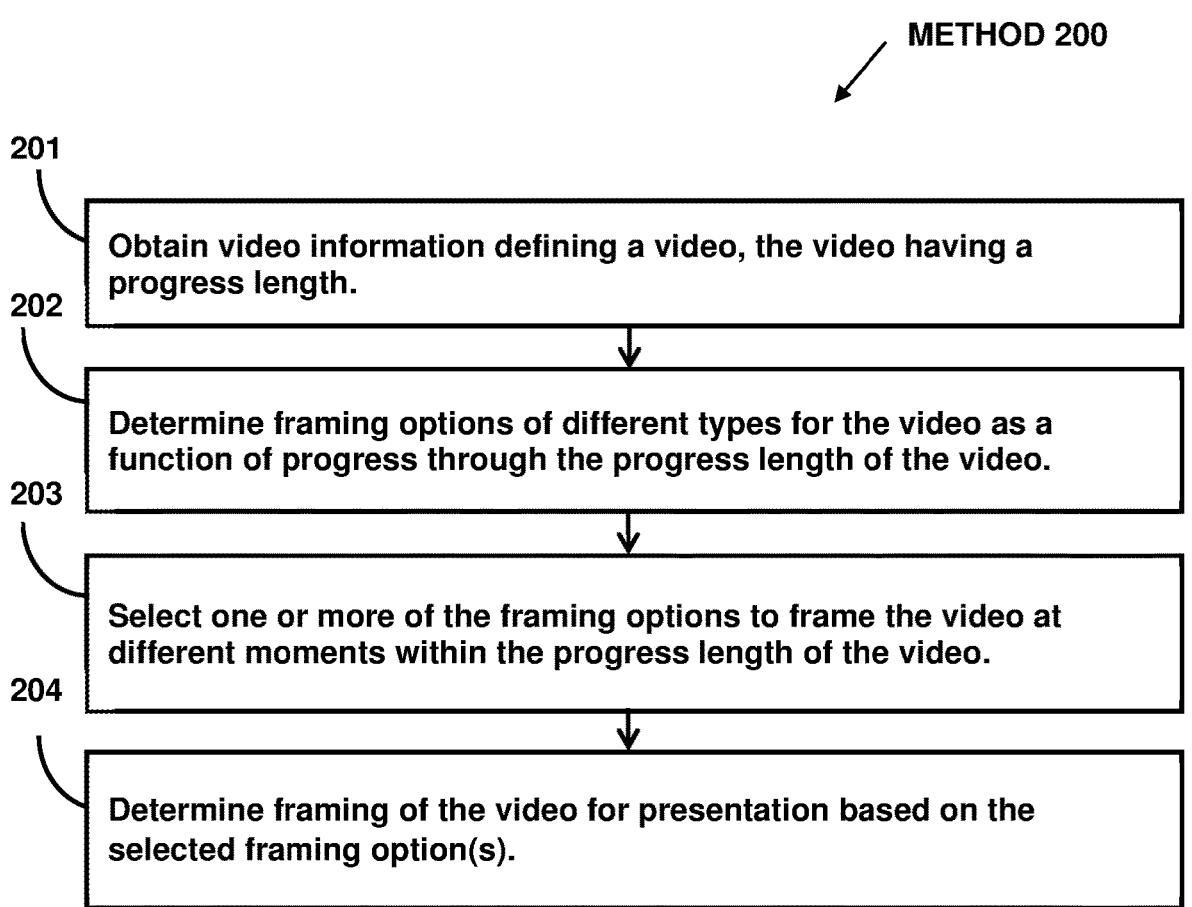

201

Obtain video information defining a video, the video having a progress length.

202

Determine framing options of different types for the video as a function of progress through the progress length of the video.

203

Select one or more of the framing options to frame the video at different moments within the progress length of the video.

204

Determine framing of the video for presentation based on the selected framing option(s).

FIG. 2 objects 302 camera motion direction 306 visual content 300 sound direction 304

TRACKS: [moment, viewing window position]
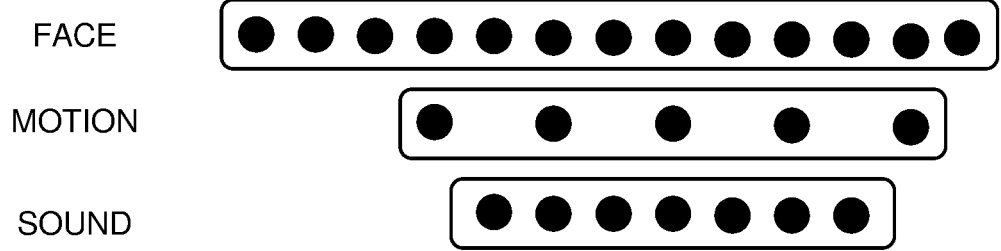
FIG. 4
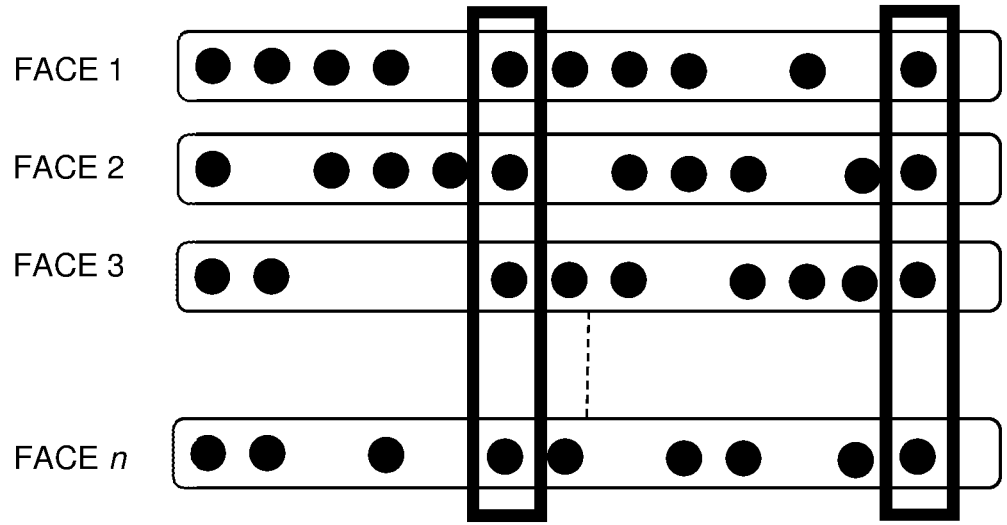
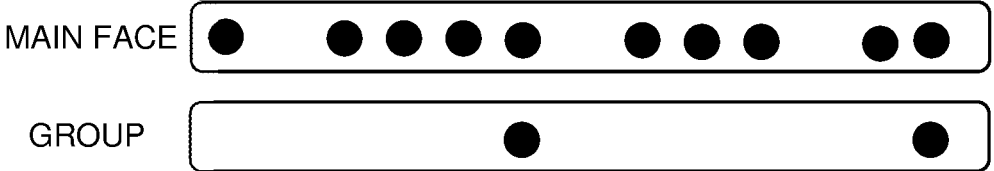
FIG. 5 priority matrix 800

| | Main Face | Group | Sound+Face | Movement | Acceleration | Deceleration | Turn | Stop |
|---|---|---|---|---|---|---|---|---|
| Main Face | 5 | 9 | 10 | 6 | 8 | 7 | 4 | 3 |
| Group | 4 | 9 | 10 | 6 | 8 | 7 | 5 | 3 |
| Sound+Face | 4 | 9 | 10 | 6 | 8 | 7 | 5 | 3 |
| Movement | 5 | 6 | 8 | 10 | 9 | 7 | 4 | 3 |
| Acceleration | 4 | 3 | 5 | 6 | 10 | 7 | 8 | 9 |
| Deceleration | 8 | 4 | 7 | 3 | 9 | 10 | 6 | 5 |
| Turn | 3 | 4 | 5 | 6 | 9 | 8 | 10 | 7 |
| Stop | 8 | 9 | 10 | 6 | 7 | 5 | 4 | 3 |

FIG. 8A priority matrix 800

| | Main Face | Group | Sound+Face | Movement | Acceleration | Deceleration | Turn | Stop |
|---|---|---|---|---|---|---|---|---|
| Main Face | 1 | 9 | 10 | 6 | 8 | 7 | 4 | 3 |
| Group | 4 | 1 | 10 | 6 | 8 | 7 | 5 | 3 |
| Sound+Face | 4 | 9 | 1 | 6 | 8 | 7 | 5 | 3 |
| Movement | 5 | 6 | 8 | 1 | 9 | 7 | 4 | 3 |
| Acceleration | 4 | 3 | 5 | 6 | 1 | 7 | 8 | 9 |
| Deceleration | 8 | 4 | 7 | 3 | 9 | 1 | 6 | 5 |
| Turn | 3 | 4 | 5 | 6 | 9 | 8 | 1 | 7 |
| Stop | 8 | 9 | 10 | 6 | 7 | 5 | 4 | 1 |

FIG. 8B

MAIN FACE

SOUND+FACE

MOTION

Selection
Curve
1010

Framing Curve
1020

Modified
Selection Curve
1030

SYSTEMS AND METHODS FOR FRAMING VIDEOS

FIELD

This disclosure relates to selecting among framing options to frame videos.

BACKGROUND

A video may have a wide field of view (e.g., spherical field of view). The wide field of view of the video may make it difficult to determine which parts (spatial extents) of the video contain interesting views. Manually reviewing the video to determine framing of the video may be difficult and time consuming.

SUMMARY

This disclosure relates to framing videos. Video information and/or other information may be obtained. The video information may define a video. The video may have a progress length. The video may include visual content viewable as a function of progress through the progress length of the video. The visual content may have a field of view. Framing options of different types may be determined for the video as a function of progress through the progress length of the video. The framing options may include a first framing option of a first type, a second framing option of a second type different from the first type, and/or other framing options of other types. One or more of the framing options may be selected to frame the video at different moments within the progress length of the video. Framing of the video for presentation may be determined based on the selected framing option(s) and/or other information.

A system for framing videos may include one or more electronic storages, one or more processors, and/or other components. An electronic storage may store video information, information relating to a video, information relating to visual content, information relating to framing options, information relating to selection of framing options, information relating to framing of the video, and/or other information.

The processor(s) may be configured by machine-readable instructions. Executing the machine-readable instructions may cause the processor(s) to facilitate framing videos. The machine-readable instructions may include one or more computer program components. The computer program components may include one or more of a video component, a framing option component, a selection component, a framing component, and/or other computer program components.

The video component may be configured to obtain video information and/or other information. The video information may define a video. The video may have a progress length. The video may include visual content viewable as a function of progress through the progress length of the video. The visual content may have a field of view.

The framing option component may be configured to determine framing options of different types for the video as a function of progress through the progress length of the video. The framing options may include a first framing option of a first type, a second framing option of a second type different from the first type, and/or other framing options of other types. In some implementations, the framing options of different types may include a motion framing option, a tracked object framing option, a sound direction framing option, and/or other framing options.

The selection component may be configured to select one or more of the framing options to frame the video at different moments within the progress length of the video. In some implementations, selection of one or more framing options to frame the video may include switching between different framing options.

In some implementations, the selection of the framing option(s) may switch between different framing options based on a priority matrix for the framing options and/or other information. The priority matrix may define priority values for the framing options. In some implementations, responsive to continuous usage of a given framing option for a threshold duration, the priority values of the priority matrix may be dynamically changed. In some implementations, the priority values of the priority matrix may be dynamically changed to reduce a given priority value of the given framing option.

The framing component may be configured to determine framing of the video for presentation based on the selected framing option(s) and/or other information. In some implementations, determination of the framing of the video for presentation based on a selected framing option may include positioning of a viewing window within the field of view of the visual content based on the selected framing option and/or other information.

In some implementations, the determination of the framing of the video for presentation based on the motion framing option may include the positioning of the viewing within the field of view of the visual content based on a direction in which an image capture device that captured the video moved during the capture of the video and/or other information.

In some implementations, the determination of the framing of the video for presentation based on the tracked object framing option may include the positioning of the viewing within the field of view of the visual content based on depiction of one or more tracked objects within the visual content and/or other information.

In some implementations, the determination of the framing of the video for presentation based on the sound direction framing option may include the positioning of the viewing within the field of view of the visual content based on one or more directions from which sound was received by the image capture device during the capture of the video and/or other information.

In some implementations, one or more parts of the progress length of the video may be selected for presentation based on the selected framing option(s) and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 2 illustrates an example method for framing videos.

FIG. 4 illustrates example framing options.

FIG. 5 illustrates example framing options.

FIG. 8A illustrates an example priority matrix for framing options.

FIG. 8B illustrates an example priority matrix for framing options.

DETAILED DESCRIPTION

Figure 1:
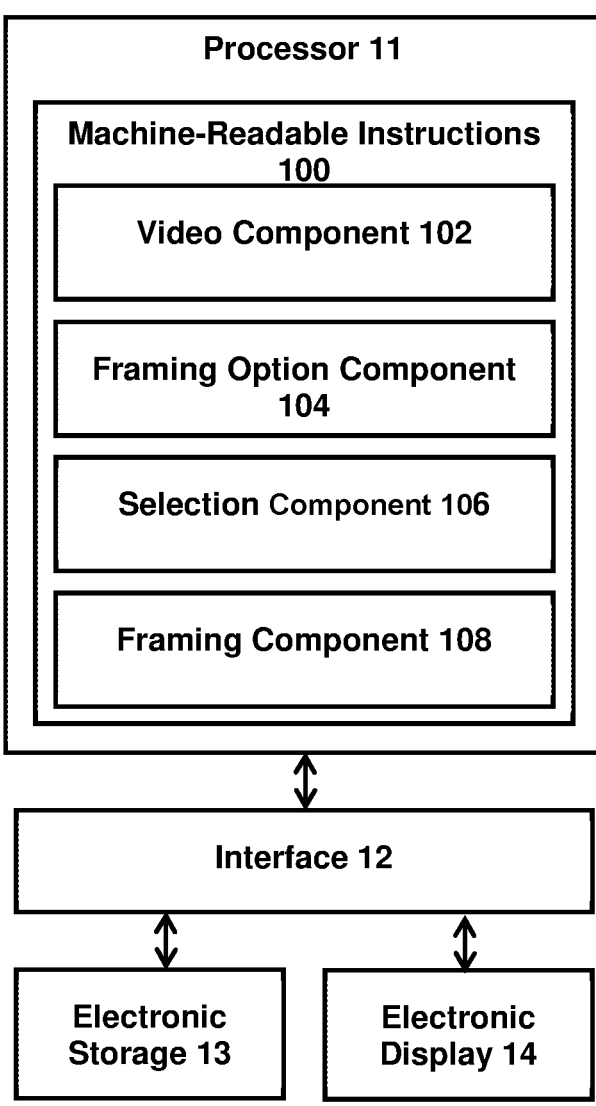
FIG. 1 illustrates an example system for framing videos.

FIG. 1 illustrates a system 10 for framing videos. The system 10 may include one or more of a processor 11, an interface 12 (e.g., bus, wireless interface), an electronic storage 13, an electronic display 14, and/or other components. Video information and/or other information may be obtained by the processor 11. The video information may define a video. The video may have a progress length. The video may include visual content viewable as a function of progress through the progress length of the video. The visual content may have a field of view. Framing options of different types may be determined by the processor 11 for the video as a function of progress through the progress length of the video. The framing options may include a first framing option of a first type, a second framing option of a second type different from the first type, and/or other framing options of other types. One or more of the framing options may be selected by the processor 11 to frame the video at different moments within the progress length of the video. Framing of the video for presentation may be determined by the processor 11 based on the selected framing option(s) and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to a video, information relating to visual content, information relating to framing options, information relating to selection of framing options, information relating to framing of the video, and/or other information.

The electronic display 14 may refer to an electronic device that provides visual presentation of information. The electronic display 14 may include a color display and/or a non-color display. The electronic display 14 may be configured to visually present information. The electronic display 14 may present information using/within one or more graphical user interfaces. For example, the electronic display 14 may present video information, information relating to a video, information relating to visual content, information relating to framing options, information relating to selection of framing options, information relating to framing of the video, and/or other information.

In some implementations, the electronic display 14 may include a touchscreen display. A touchscreen display may be configured to receive user input via a user's engagement with the touchscreen display. A user may engage with the touchscreen display via interaction with one or more touch-sensitive surfaces/screens and/or other components of the touchscreen display. The electronic display 14 may be a standalone device or a component of a computing device, such as an electronic display of a mobile device (e.g., camera, smartphone, smartwatch, tablet, laptop) or a desktop device (e.g., monitor). User interaction with elements of graphical user interface(s) may be received through the electronic display (e.g., touchscreen display) and/or other user interface devices (e.g., keyboard, mouse, trackpad).

Visual content may refer to content of image(s), video frame(s), and/or video(s) that may be consumed visually. For example, visual content may be included within one or more images and/or one or more video frames of a video. The video frame(s) may define/contain the visual content of the video. The video may include video frame(s) that define/contain the visual content of the video. Video frame(s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the processor 11, the interface 12, the electronic storage 13, and/or the electronic display 14 of the system 10 may be carried by the housing of the image capture device. The image capture device may carry other components, such as one or more optical elements and/or one or more image sensors.

An image capture device may refer to a device that captures visual content. An image capture device may capture visual content in the form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet).

A video with a wide field of view (e.g., spherical video, panoramic video) may depict a large portion of a scene. The wide field of view of the video may make it difficult for a user to determine which spatial extent of the video depicts something interesting. When the user is viewing a particular extent of the video, the user may not know what is going on in other extents of the video. The user may not know when the direction and/or the size of view should be changed. The user may not know in what direction the view should be changed and/or whether the view should be made smaller or larger.

The present disclosure enables automatic framing of a video (e.g., a wide field of view video) based on selection of framing options for the video. The present disclosure may be used to continuously or discretely frame the video based on video metadata without requiring manual framing by the user. Framing options of different types may be determined for various moments in the video based on one or more aspects of the video. The aspects of the video may include capture aspects of the video (e.g., how the image capture device moved during capture of the video) and/or content aspects of the video (e.g., what is captured/depicted within the video). The video may be framed by automatically switching between different framing options based on a priority matrix. The values of the priority matrix may be set/updated based on user data to provide views of the video that are customized for the user. The framing options selected for the video may be used to select which moments of the video are included in the framed video (e.g., video edit with the framed views, video playback with the framed views). The present disclosure may be used to automatically determine which spatial extents and which temporal parts of the video are included in the framed video.

The processor 11 (or one or more components of the processor 11) may be configured to obtain information to facilitate framing videos. Obtaining information may include one or more of accessing, acquiring, analyzing, capturing, determining, examining, generating, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate framing videos. The machine-readable instructions 100 may include one or more computer program components. The machine-readable instructions 100 may include one or more of a video component 102, a framing option component 104, a selection component 106, a framing component 108, and/or other computer program components.

The video component 102 may be configured to obtain video information and/or other information. In some implementations, the video information component 102 may obtain video information based on user interaction with a user interface/application (e.g., video editing application, video player application), and/or other information. For example, a user interface/application may provide option(s) for a user to play and/or edit videos. The video information for a video may be obtained based on the user's selection of the video through the user interface/video application. Other selections of a video for retrieval of video information are contemplated.

The video information may define a video. The video may have a progress length. The progress length of a video may be defined in terms of time durations and/or frame numbers. For example, a video may have a time duration of 60 seconds. A video may have 1800 video frames. A video having 1800 video frames may have a play time duration of 60 seconds when viewed at 30 frames per second. Other progress lengths, time durations, and frame numbers of videos are contemplated.

The video may include visual content viewable as a function of progress through the progress length of the video. The video may include audio content playable as a function of progress through the progress length of the video. The audio content may include sound captured during capture of the video and/or other sounds. Audio content of the video may be associated with one or more directions. The video may include information on the direction of arrival of the audio content. The direction of arrival of the audio content may include the direction from which the sound waves arrived at the image capture device/sound sensor that captured the audio content.

The visual content may have a field of view. A field of view of a video/visual content may refer to a field of view of a scene captured within the video/visual content (e.g., within video frames). A field of view of a video/visual content may refer to the extent of a scene that is captured within the video/visual content. A video may include a wide field of view video. A wide field of view video may refer to a video with a wide field of view. A wide field of view may refer to a field of view that is larger/wider than a threshold field of view/angle. For example, a wide field of view may refer to a field of view that is larger/wider than 60-degrees. In some implementations, a wide field of view video may include a spherical video having a spherical field of view. Spherical field of view may include 360-degrees of capture. Spherical field of view may include views in all directions surrounding the image capture device. The spherical video may include spherical visual content (visual content having spherical field of view) viewable as a function of progress through the progress length of the video. Spherical field of view may include a complete sphere or a partial sphere.

Other fields of view of videos are contemplated. A wide field of view video may include and/or may be associated with spatial audio.

The video information may define a video by characterizing, describing, identifying, quantifying, reflecting, and/or otherwise defining the video. The video information may define a video by including information that defines one or more content, qualities, attributes, features, and/or other aspects of the video/video content. For example, the video information may define a video by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

Video information may be stored within a single file or multiple files. For example, video information defining a video may be stored within a video file, multiple video files, a combination of different files (e.g., a visual file and an audio file), and/or other files. Video information may be stored in one or more formats or containers.

A video may be captured by an image capture device. A video may be captured by an image capture device while the image capture device is experiencing motion. The motion experienced by the image capture device may include rotational motion (e.g., rotation of the image capture device about yaw axis, pitch axis, and/or roll axis) and/or translational motion (e.g., lateral and/or vertical movement).

The framing option component 104 may be configured to determine framing options of different types for the video. Determining a framing option for the video may include ascertaining, calculating, computing, establishing, finding, setting, and/or otherwise determining the framing option for the video. The framing options may include a first framing option of a first type, a second framing option of a second type different from the first type, and/or other framing options of other types. Framing options of different types may be determined as a function of progress through the progress length of the video. Determining a framing option for a moment in the video may include determining whether the framing option is available to frame the video at that time in the video. Same or different types of framing options may be determined for different moments in the video. Multiple types of framing options may be determined for one or more moments in the video.

A framing option may refer to an option corresponding to a particular type of framing. A framing option may refer to a kind, pattern, style, and/or way of framing that may be selected to frame the video. Different types of framing options may correspond to framing of different types. For example, the framing options of different types that may be determined for the video may include a motion framing option, a tracked object framing option, a sound direction framing option, and/or other framing options. A motion framing option may refer to a framing option that frames the video based on motion of the image capture device during capture of the video and/or other information. A tracked object framing option may refer to a framing option that frames the video based on tracking of one or more objects through the video and/or other information. A sound direction framing option may refer to a framing option that frames the video based on direction of arrival of audio content of the video and/or other information. Other types of framing options are contemplated.

A framing option may be determined based on one or more aspects of the video. A framing option for a moment in the video may be determined based on the aspect(s) of the video at the moment in the video. Framing options of different types may be determined based on same aspect(s) of the video and/or different aspect(s) of the video. An aspect of the video may refer to one or more of characteristic, feature, quality, quantity, trait, property, value, measurable factor, and/or other information relating to the video. An aspect of the video may include qualitative and/or quantitative aspect of the video. An aspect of the video may include a capture aspect of the video, content aspect of the video of the video, and/or other aspect of the video.

A capture aspect of the video may refer to an aspect of the image capture device during capture of the video. A capture aspect of the video may include a temporal aspect (e.g., date and/or time of video capture), a spatial aspect (e.g., location of video capture), an environmental aspect (e.g., environment condition during video capture), a motion aspect (e.g., speed, acceleration, direction of gravity, change in orientation of the image capture device during video capture), a capture setting aspect (e.g., settings of the image capture device used during video capture), and/or other capture aspect.

A content aspect of the video may refer to an aspect of the content of the video. A content aspect of the video may include a visual aspect (e.g., color, histogram, contrast, brightness, resolution, framerate, objects depicted within the visual content, activities depicted within the visual content), an audio aspect (e.g., direction of audio arrival, amount and/or type of sound, keywords detected within the audio content, energy of sounds captured within the audio content), and/or other content aspect. Other aspects of the video are contemplated.

In some implementations, the aspect(s) of the video may be determined based on analysis of the video, the metadata of the video, and/or other information. In some implementations, the aspect(s) of the video may be stored with the video (e.g., contained within the metadata of the video). For example, the aspects of the video described within the metadata of the video may be analyzed to automatically determine framing options for the video.

Figure 3:
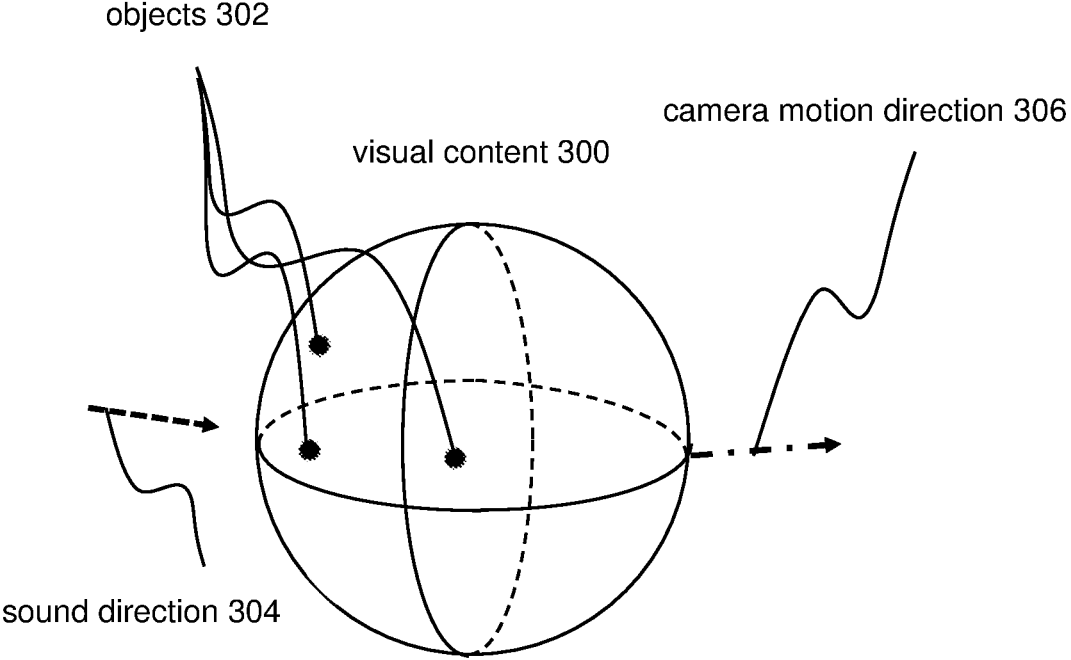
FIG. 3 illustrates example visual content.

FIG. 3 illustrates example visual content 300. The visual content 300 may depict objects 302 at different spatial locations. The visual content 300 may be captured by an image capture device. Sound direction 304 may indicate the direction from which sound that was recorded with the visual content 300 was received by the image capture device. The sound direction 304 may indicate the direction of the source of the sound that was recorded with the visual content 300 with respect to the image capture device. The image capture device may have experienced motion while capturing the visual content 300. Camera motion direction 306 may indicate the direction in which the image capture device moved while capturing the visual content 300.

FIG. 4 illustrates example framing options for a video. In FIG. 4, the framing options for the video may include a face framing option, a motion framing option, and a sound framing option. The framing options may be determined for different moments in the video. Individual dots may represent when a particular framing option is available for a particular moment in the video. The framing options for the video may be stored in one or more tracks (e.g., a face framing track, a motion framing track, and a sound framing track). For each moment in which a framing option is available for the video, the framing track may store information on the moment (e.g., time, frame number) to be framed and how the video is to be framed at the moment, such as information on the positioning of a viewing window (e.g., pan, tilt, roll) within the field of view of the visual content at the moment. For example, for the face framing option, the face framing track may provide information on when a face is depicted within the visual content and the positioning of the face within the visual content at different moment. For the motion framing option, the motion framing track may provide information on the direction in which the image capture device moved at different moments during capture of the video. For the sound framing option, the sound framing track may provide information on direction from which sound was received by the image capture device at different moments during capture of the video.

FIG. 5 illustrates example framing options for a video. In FIG. 5, the framing options for the video may include a main face framing option and a group framing option. The framing options may be determined for different moments in the video. Individual dots may represent when a particular framing option is available for a particular moment in the video. Face tracks (FACE 1, FACE 2, FACE 3, . . . . FACE n) may store information on where different faces are located at different moments in the video. The face tracks may store information on when a particular face is depicted within the visual content and the positioning of the particular face within the visual content at different moments.

The main face framing option may be determined based on tracking of a particular face in the video. For example, the main face framing option may be determined based on the face tracked in FACE 2 track. The main face framing track may provide information on when FACE 2 is depicted within the visual content and the positioning of the FACE 2 within the visual content. The group framing option may be determined based on tracking of multiples faces in the video. For example, the group framing option may be determined to be available at moments in the video where a certain number/at least a threshold number of faces are grouped together (e.g., within a certain degree of each other, within a certain area of the visual content). The group framing track may provide information on when faces are grouped within the visual content and the positioning of the grouped faces (e.g., averaged positioning of the faces in the group of faces) within the visual content.

Figure 6:
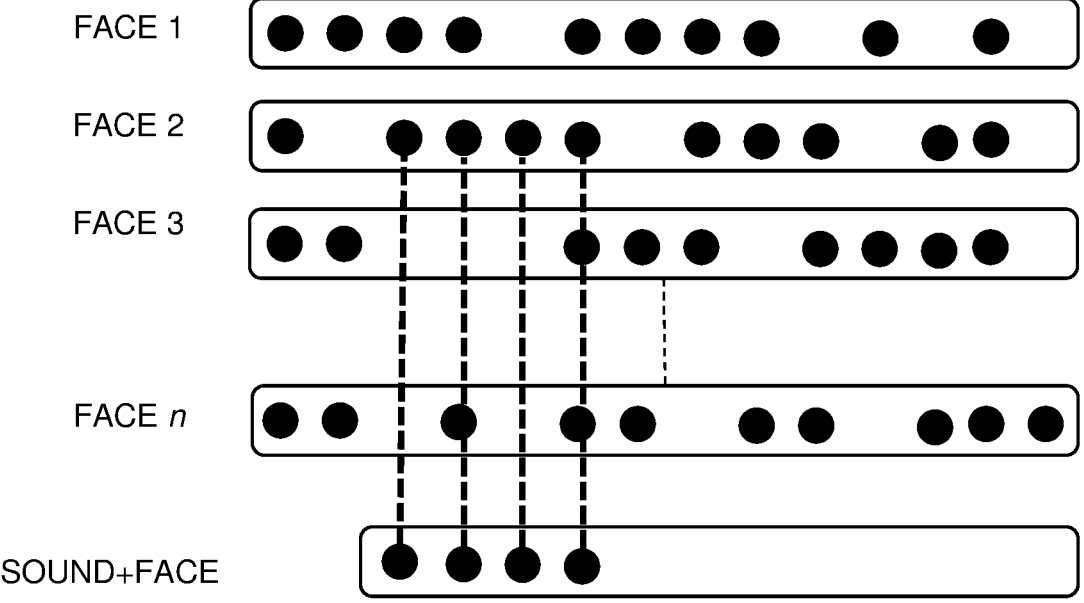
FIG. 6 illustrates an example framing option.

FIG. 6 illustrates an example framing option for a video. In FIG. 6, the framing option for the video may include a sound+face framing option. The sound+face framing option may be determined for different moments in the video. Individual dots may represent when the sound+face framing option is available for a particular moment in the video. Face tracks (FACE 1, FACE 2, FACE 3, . . . . FACE n) may store information on where different faces are located at different moments in the video. The face tracks may store information on when a particular face is depicted within the visual content and the positioning of the particular face within the visual content at different moments.

The sound+face framing option may be determined based on the direction(s) of from which sound was received by the image capture device during the capture of the video. For example, the sound+face framing option may be determined to be available at moments in the video where the direction from which sound was received by the image capture device (sound direction) corresponds to a face (e.g., any face; a particular face, such as the main face). The sound+face framing option may be determined to be available at moments in the video where the sound direction is in the same direction/within a threshold angle of the depiction of a face. The sound+face framing track may provide information on when the direction of sound correspond to a face. The sound+face framing track may provide information on the sound direction and/or the positioning of the face that correspond to the sound direction.

Figure 7:
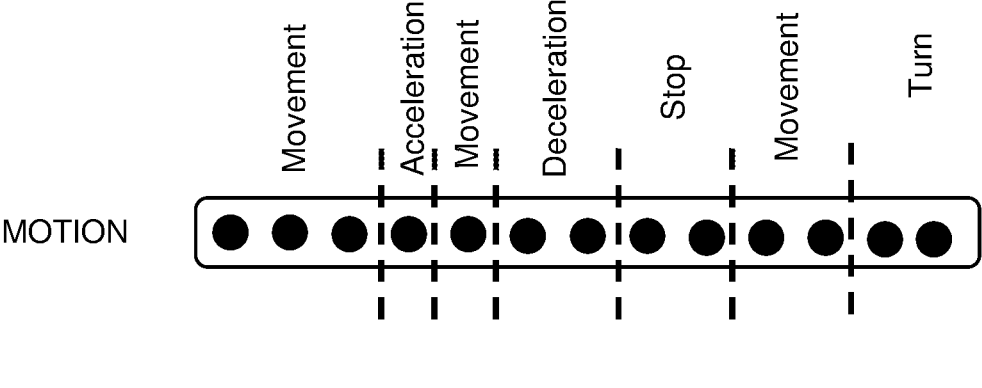
FIG. 7 illustrates an example framing option.

FIG. 7 illustrates an example framing option for a video. In FIG. 7, the framing option for the video may include a motion framing option. The motion framing option may be determined for different moments in the video. Individual dots may represent when the motion framing option is available for a particular moment in the video. The motion framing track may provide information on how the image capture device was moving at different moments during capture of the video. The motion framing track may provide information on the direction of image capture device motion at different moments during capture of the video. The types of motion experienced by the image capture device may be determined/classified. The motion framing option/motion framing track may include information on the types of motion experienced by the image capture device. For example, FIG. 7 shows different types of motion experienced by the image capture device (e.g., Movement for image capture device moving without changes in speed/direction; Acceleration for image capture device moving with increasing speed; Deceleration for image capture device moving with decreasing speed; stop for image capture device being still; Turn for image capture device moving with changes in direction of movement). Other types of motion are contemplated.

The selection component 106 may be configured to select one or more of the framing options to frame the video at different moments within the progress length of the video. The framing options may be selected as a function of progress through the progress length of the video. Selecting a framing option may include one or more of activating, ascertaining, choosing, finding, identifying, picking, and/or otherwise selecting the framing option. A framing option may be selected for individual moments within the progress length of the video. A framing option may be selected for different moments within the progress length of the video to control how the video will be framed at the different moments.

In some implementations, selection of one or more framing options to frame the video may include switching between different framing options. The selection component 106 may change which framing options are used for different moments in a video. For example, one framing option may be selected for one temporal part of the video and another framing option may be selected for another temporal part of the video. In some implementations, a framing option may be required to be selected for at least a minimum duration. That is, a selected framing option may be required to be used for a minimum duration. For example, once a framing option has been selected to be used starting a moment in time, the selected framing option may be required to be continuously used for a minimum duration (e.g., two seconds). Different framing options may have the same minimum duration or different minimum durations.

Switching among different framing options may be performed based on heuristics, rules, preferences, constraints, and/or other factors. For example, one framing option, such as the main face framing option, may be set to be the default if it is available. The sound+face framing option may become a higher priority for selection if the face is detected with high confidence (e.g., higher than threshold amount of confidence) and is detected/tracked for a threshold duration.

The group framing option may be the next on the priority if it is continuously available a threshold duration. The motion framing option where the image capture device was accelerating or decelerating may be selected for reframing if the sound+face framing option and the group framing option are not available. The motion framing option where the image capture device was stopped may be selected to switch to the main face framing option or the group framing option. The selection may switch between the motion framing option and the main face framing option if no other options are available.

Heuristics, rules, preferences, constraints, and/or other factors used to switch between framing options may be tailored to user preferences, styles of framing, styles of video editing, and/or types of content captured within the video (e.g., based on objects and/or activities captured within the video). Different sets of heuristics, rules, preferences, constraints, and/or other factors may be used to frame the video differently. Use of other heuristics, rules, preferences, constraints, and/or other factors to switch between framing options are contemplated.

In some implementations, the selection of the framing option(s) may switch between different framing options based on a priority matrix for the framing options and/or other information. The priority matrix may refer to a matrix that defines the priorities of different framing options. The priority matrix may refer to a matrix that includes values that indicate the priorities of different framing options (priority values). The priority matrix may define priority values for the framing options. For example, the priority matrix may define priority values for one or more of a motion framing option (e.g., motion framing option for movement, acceleration, deceleration, turn, stop), a tracked object framing option (e.g., main face framing option, group framing option), and a sound direction framing option (e.g., sound+face framing option). In some implementations, higher priority values may indicate higher priority of the corresponding framing options. In some implementations, lower priority values may indicate higher priority of the corresponding framing options.

The priority matrix/priority values may be tailored to user preferences, styles of framing, styles of video editing, and/or types of content captured within the video (e.g., based on objects and/or activities captured within the video). Different priority matrices/different priority values may be used to frame the video differently. For example, different priority matrices/different priority values may be used for different types of video (e.g., scenic video vs action video) or different types of activities captured within the video (e.g., surfing video vs biking video). The priority matrices/priority values for a particular may be generated/determined based on how the user frames the videos. For example, information on how the user framed one or more videos may be input to a machine learning model that outputs the priority matrices/priority values for the user.

FIG. 8A illustrates an example priority matrix 800 for framing options. The priority matrix 800 may define priority values for the following framing options: main face framing option, group framing option, sound+face framing option, movement framing option (motion framing option for image capture device moving without changes in speed/direction), acceleration framing option (motion framing option for image capture device moving with increasing speed), deceleration framing option (motion framing option for image capture device moving with decreasing speed), turn framing option (motion framing option for image capture device moving with changes in direction of movement), and stop framing option (motion framing option for image capture device being still). The left column of the priority matrix may correspond to the framing option that is selected/being used. The priority values for various framing options when a particular framing option is selected/being used may be provided to the right. For example, when the group framing option is selected/being used, the main face framing option may have the priority value of 4, the sound+face framing option may have the priority value of 10, the movement framing option may have the priority value of 6, and so forth. The magnitude of the priority values may indicate the priority of the corresponding framing options. For example, higher priority values may indicate higher priority of the corresponding framing options.

The priority matrix 800 may be used to switch between different framing options. For example, the group framing option may be selected to frame the video. After the selection, the group framing option may be used to frame the video until a framing option with a higher priority value becomes available. For example, the framing of the video may switch from the group framing option (with the priority value of 9) to the sound+face framing option (with the priority value of 10 when the group framing option is being used) when the sound+face framing option becomes available. The framing of the video may not switch from the group framing option to the main face framing option even when the main face framing option is available because the main face framing option has lower priority than the group framing option.

In some implementations, responsive to continuous usage of a framing option for a threshold duration, the priority values of the priority matrix may be dynamically changed. After a framing option has been selected/used to framing the video for a threshold duration (maximum duration), the priority values of the priority matrix may be dynamically changed. Different framing options may have the same threshold duration (a single maximum duration) or different threshold durations (different maximum durations).

Such dynamic changes in the priority matrix may result in more varied framing of the video. Such dynamic changes in the priority matrix may cause the framing option for the video to switch more frequency. In some implementations, the priority values of the priority matrix may be dynamically changed to reduce the priority value of the framing option that is currently selected/being used. For example, the priority values corresponding to the framing option that is currently selected/being used may be decreased and/or the priority values corresponding to other framing options may be increased.

For example, FIG. 8B illustrates an example change in the priority matrix 800. The priority values of the priority matrix 800 may be dynamically changed based on continuous usage of a framing option for a threshold duration. For example, the priority values may change from those shown in FIG. 8A to those shown in FIG. 8B based on continuous usage of the group framing option for a threshold duration (maximum duration, such as six seconds). After the group framing option has been selected/used for the threshold duration, the priority values may be changed to cause a switch in the framing options. For example, as shown in FIG. 8B, the priority values along the diagonal of the priority matrix 800 may be changed to 1. Such a change may cause the currently selected/used framing option to have the lowest priority. Such a change may cause the framing option selection to switch to another framing option when another framing option become available.

Figure 9:
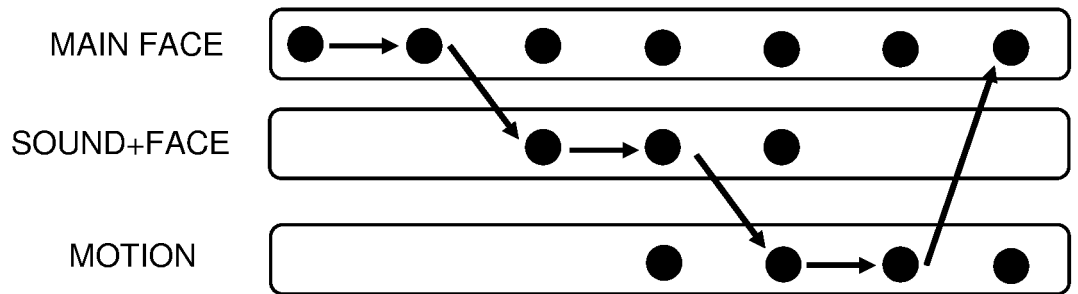
FIG. 9 illustrates an example selection of framing options.

FIG. 9 illustrates an example selection of framing options. Availability of the main face framing option, the sound+face framing option, and the motion framing option may be determined for different moments in the video. The framing option select may switch between the main face framing option, the sound+face framing option, and the motion framing option based on the ability of the framing options, the priority values of the framing options in the priority matrix, and/or other information. In the example selection of framing options shown in FIG. 9, the main face framing option may be selected at the beginning of the video. When the sound+face framing option becomes available, the framing option selection may switch from the main face framing option to the sound+face framing option. When the motion framing option becomes available, the framing option selection may continue with the sound+face framing option. After the sound+face framing has been used for the maximum duration, the priority matrix may dynamically change, and the framing option selection may switch from the sound+face framing option to the motion framing option. For the last part of the video, the framing option selection may switch from the motion framing option to the main face framing option. Other changes in the selection of framing options are contemplated.

The framing component 108 may be configured to determine framing of the video for presentation. The framing of the video may be determined as a function of progress through the progress length of the video. The framing of the video may be determined for different moments in the video. Determining framing of the video may include determining framing of the visual content of the video. Determining framing of the video may include ascertaining, calculating, computing, establishing, finding, setting, and/or otherwise determining the framing of the video. Framing of the video may be determined at the moments in the video in which framing options are selected. Framing of the video may be determined at other moments in the video (e.g., moments between framing option selection).

The framing of the video may refer to how the visual content of the video is manipulated for presentation (e.g., for current presentation, for later presentation, for inclusion in a video clip). The framing of the video may define positioning of a viewing window for the visual content within the video. The framing of the video may define where and how the viewing window is placed within the field of view of the visual content.

A viewing window may define the extents of the visual content to be included within a presentation of the video (e.g., for current presentation, for later presentation, for inclusion in a video clip). A viewing window may define extents of the visual content to be included within a punchout of the visual content. A punchout of visual content may refer to an output of one or more portions of the visual content for presentation. A punchout of the visual content may refer to extents of the visual content that is obtained for viewing and/or extraction. The extents of the visual content viewable/extracted within the viewing window may be used to provide views of different spatial extents of the visual content.

A punchout of visual content may include output of a virtual camera. A virtual camera may define one or more spatial extents of the visual content to be output based on orientation of the virtual camera with respect to the visual content of the video. A virtual camera may represent the point of view from which different spatial extents of the visual content are observed. Different punchouts of the visual content may include outputs of different virtual cameras to provide views of differential spatial extents of the visual content.

Positioning of a viewing window within the field of view of the visual content may refer to placement of the viewing window within the field of view of the visual content. The positioning/placement of the viewing window may be defined by one or more of viewing direction, viewing size, viewing rotation, and/or other information. Individual framing of the visual content may define (e.g., determine, establish, include, set) positioning of the viewing window within the field of view of the visual content based on the corresponding viewing direction, viewing size, viewing rotation, and/or other information. An individual framing of the visual content may define arrangement of pixels within the viewing window for presentation. The arrangement of the pixels within the viewing window may be defined by viewing projection and/or other information. Individual framing of the visual content may define corresponding viewing projection of the visual content within the viewing window.

A viewing direction may define a direction of view for a viewing window. A viewing direction may define the angle/visual portion of the visual content at which a viewing window may be directed. A viewing size may define the size of the viewing window. A viewing size may define a size (e.g., size, magnification, viewing angle) of viewable extents of visual content within the viewing window. A viewing size may define the dimension/shape of the viewing window. A viewing rotation may define a rotation of the viewing window. A viewing rotation may define one or more rotations of the viewing window about one or more axis. A viewing projection may define how pixels within the viewing window is arranged for presentation on an electronic display. A viewing projection may define how the pixels of an image are arranged to form the visual content. A viewing projection may refer to how portions of the visual content/pixels are mapped onto a surface (e.g., two-dimensional plane).

The framing of the video may be determined based on the selected framing option(s) and/or other information. The framing of the video at a moment in the video may be determined based on the framing option selected for the moment in the video. If a framing option has not been selected for a moment in the video, the framing of the video the moment may be determined based on the last selected framing option.

In some implementations, determination of the framing of the video at a moment within the progress length may include determination of a viewing direction for the viewing window at the moment within the progress length. The selected framing option for the moment may be used to determine the viewing direction for the visual content at the moment within the progress length. In some implementations, the determination of the framing of the video at the moment within the progress length may include determination of a viewing size for the viewing window at the moment within the progress length. The selected framing option for the moment may be used to determine how much of the field of view of the visual content will be included within the viewing window.

In some implementations, determination of the framing of the video for presentation based on a selected framing option may include positioning of a viewing window within the field of view of the visual content based on the selected framing option and/or other information. Where and how the viewing window is positioned within the field of view of the visual content may be determined based on the selected framing option and/or other information. Where and how the viewing window is positioned within the field of view of the visual content may change based on selection of different framing options.

For example, the video may have been captured by an image capture device, and determination of the framing of the video for presentation based on the motion framing option may include the positioning of the viewing within the field of view of the visual content based on a direction in which the image capture device moved during the capture of the video and/or other information. For instance, the viewing window may be positioned within the field of view of the visual content based on a direction in which the image capture device moved during video capture to provide a view in the direction in which the image capture device moved during video capture. The viewing window may be positioned within the field of view of the visual content to provide a view that is aligned with the direction of image capture device motion (e.g., translational motion, rotational motion). The viewing window may be positioned to include the direction of image capture device motion at the center/within a center area of the viewing window. The position of the viewing window within the field of view of the visual content may change to follow the direction of image capture device motion. Provision of other views with respect to the image capture device motion (e.g., a back view that is opposite the direction of image capture device motion, a side/top/bottom view that is perpendicular to the direction of image capture device motion) are contemplated.

Determination of the framing of the video for presentation based on the sound direction framing option may include the positioning of the viewing within the field of view of the visual content based on one or more directions from which sound was received by the image capture device during the capture of the video and/or other information. For instance, the viewing window may be positioned within the field of view of the visual content based on a direction from which sound was received by the image capture device during video capture to provide a view in the direction of the sound source during video capture. The viewing window may be positioned within the field of view of the visual content to provide a view that is aligned in the direction of the sound source. For example, the viewing window may be positioned within the field of view of the visual content to provide a view in the direction of a face that produced sound during video capture. The viewing window may be positioned to include the direction of the sound source (e.g., face) at the center/within a center area of the viewing window. The position of the viewing window within the field of view of the visual content may change to follow the direction of sound source. Provision of other views with respect to the sound source (e.g., a view that is opposite the direction of the sound source, a view that is in the direction of eye gaze of the face that produced sound) are contemplated.

Determination of the framing of the video for presentation based on the tracked object framing option may include the positioning of the viewing within the field of view of the visual content based on depiction of one or more tracked objects within the visual content and/or other information. The viewing window may be positioned within the field of view of the visual content based on the depiction of the tracked object(s) (e.g., main face, group of faces, other objects) to provide a view of the tracked object(s). The viewing window may be positioned within the field of view of the visual content to include the tracked object(s) within the viewing window (e.g., at the center/within a center area of the viewing window). Other framing of the video is contemplated.

The framing of the video may be used to generate a presentation of the video. The visual content of the video within the viewing window may be used to generate a video clip (e.g., 2D video, video summary, video edit). The video clip may be stored in the electronic storage 13. The visual content of the video within the viewing window may be presented on one or more electronic displays. The visual content may be presented based on the viewing window and/or other information. Presentation of the visual content may include presentation of one or more punchouts of the visual content. One or more punchouts of the visual content may be presented to provide views of one or more different spatial extents of the visual content. A punchout of the visual content may be presented based on a viewing window and/or other information. Presentation of the visual content may include presentation of the extent of the visual content within the viewing window. Presentation of the visual content may include playback of audio content of the video. In some implementations, different spatial extents of the video may be associated with different directions of spatial audio, and the directions of the spatial audio corresponding to the punched out extents of the visual content may be played/included in the presentation.

In some implementations, one or more parts of the progress length of the video may be selected for presentation based on the selected framing option(s) and/or other information. The selected framing option(s) may be used to determine both which spatial extents of the video are included in the presentation and which temporal parts of the video are included in the presentation. For example, which temporal parts of the video are included in the presentation may be determined based on scoring of different moments in the video. The selected framing option(s) may be used to score the different moments in the video or to change the scoring of the different moment in the video. For example, a selection curve may be generated for the video based on one or more aspects of the video. For instance, a selection curve may be generated based on whether moments in the video include certain activity (e.g., jump, cheering) and/or certain objects (e.g., face, smiling). The selection curve may define/indicate the scores for different moments in the video. The values of the selection curve may determine which temporal parts of the video are included in the presentation.

The selection curve may be modified based on the selected framing option(s). For instance, a framing curve may be generated based on the framing option(s) selected for different moments. The framing option(s) may be associated with different scores (e.g., the priority values of the priority matrix) and the framing curve may define/indicate the scores associated with the selected framing options for different moments in the video. The frame curve may be used to modify the selection curve (e.g., combined with the selection curve, added to the selection curve). As another example, the selected framing options may be included as one of the aspects used to generate the selection curve.

Figure 10:
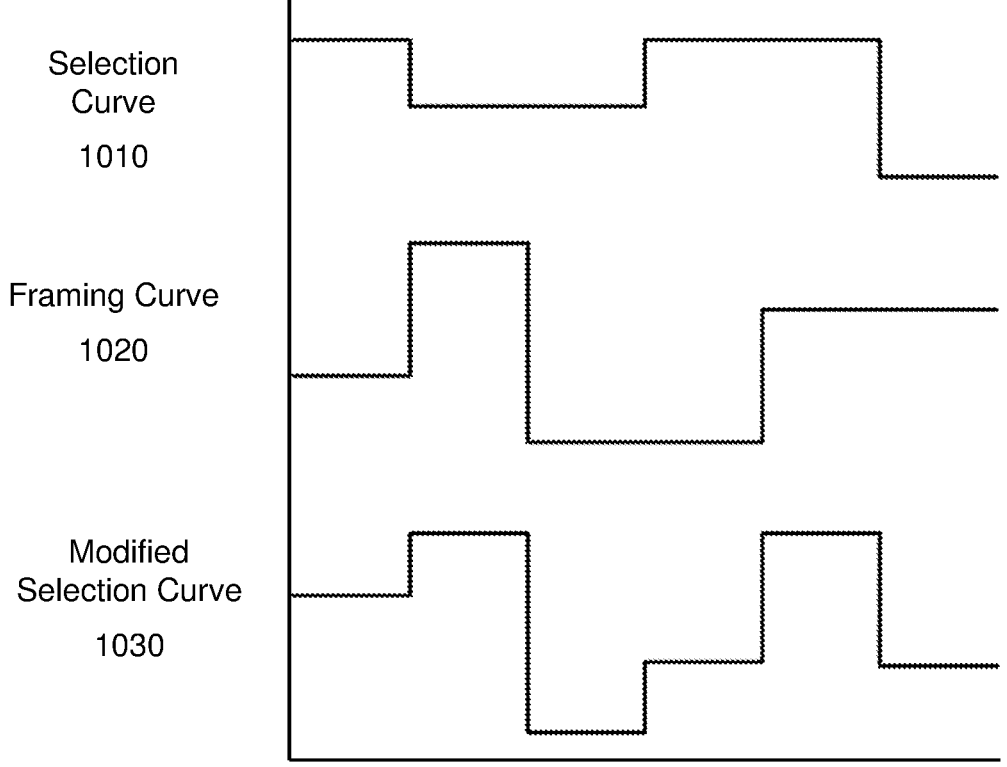
FIG. 10 illustrates example curves for selecting temporal parts of a video for inclusion in a presentation.

FIG. 10 illustrates example curves for selecting temporal parts of a video for inclusion in a presentation. A selection curve 1010 may define/indicate the scores for different moments in the video. The scores for different moments in the video may be used to determine which temporal prats of the video are included in the presentation. For example, the temporal parts of the video for which the selection curve 1010 has a score higher than a threshold may be included in the presentation. The temporal parts of the video with the highest score may be included in the presentation. The temporal parts of the video that continuously has a score higher than a threshold may be included in the presentation.

A framing curve 1020 may define/indicate the scores associated with selected framing options for different moments in the video. For example, the framing curve 1020 may define/indicate the priority values of the selected framing options for different moments in the video.

The selection curve 1010 may be modified based on the framing curve 1020 to generate the modified selection curve 1030. For example, the modified selection curve 1030 may be generated by combining the selection curve 1010 and the framing curve 1020. The framing curve 1020 may change the scores of the selection curve 1010 in generating the modified selection curve 1030. Use of the modified selection curve may result in selection of different temporal parts of the video in the presentation than use of the selection curve 1010.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

While the implementations of the disclosure are described with respect to the system 10, this is merely as an example and is not meant to be limiting. In some implementation, some or all of the functionalities attributed herein to the system 10 may be performed by another system, one or more computing devices, and/or one or more processing apparatuses (e.g., tangible hardware/equipment that processes information). In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the electronic display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of the computer program components may provide more or less functionality than is described. For example, one or more of the computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

FIG. 2 illustrates method 200 for framing videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, video information and/or other information may be obtained. The video information may define a video. The video may have a progress length. The video may include visual content viewable as a function of progress through the progress length of the video. The visual content may have a field of view. In some implementations, operation 201 may be performed by a processor component the same as or similar to the video component 102 (Shown in FIG. 1 and described herein).

At operation 202, framing options of different types may be determined for the video as a function of progress through the progress length of the video. The framing options may include a first framing option of a first type, a second framing option of a second type different from the first type, and/or other framing options of other types. In some implementations, operation 202 may be performed by a processor component the same as or similar to the framing option component 104 (Shown in FIG. 1 and described herein).

At operation 203, one or more of the framing options may be selected to frame the video at different moments within the progress length of the video. In some implementations, operation 203 may be performed by a processor component the same as or similar to the selection component 106 (Shown in FIG. 1 and described herein).

At operation 204, framing of the video for presentation may be determined based on the selected framing option(s) and/or other information. In some implementations, operation 204 may be performed by a processor component the same as or similar to the framing component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for framing videos, the system comprising:
one or more physical processors configured by machine-readable instructions to:
obtain video information defining a video, the video having a progress length, the video including visual content viewable as a function of progress through the progress length, the visual content having a field of view;
determine framing options of different types for the video as a function of progress through the progress length, the framing options including a first framing option of a first type and a second framing option of a second type different from the first type;
select one or more of the framing options to frame the video at different moments within the progress length of the video, wherein selection of the one or more of the framing options to frame the video includes switching between different ones of the framing options;
determine framing of the video for presentation based on the one or more selected framing options, wherein determination of the framing of the video for presentation based on a selected framing option includes positioning of a viewing window within the field of view of the visual content based on the selected framing option, and
wherein the selection of the one or more of the framing options switches between the different ones of the framing options based on a priority matrix for the framing options, the priority matrix defining priority values for the framing options, further wherein responsive to continuous usage of a given framing option for a threshold duration, the priority values of the priority matrix are dynamically changed.

2. A system for framing videos, the system comprising:
one or more physical processors configured by machine-readable instructions to:
obtain video information defining a video, the video having a progress length, the video including visual content viewable as a function of progress through the progress length, the visual content having a field of view;
determine framing options of different types for the video as a function of progress through the progress length, the framing options including a first framing option of a first type and a second framing option of a second type different from the first type;
select one or more of the framing options to frame the video at different moments within the progress length of the video;
determine framing of the video for presentation based on the one or more selected framing options,
wherein selection of the one or more of the framing options to frame the video includes switching between different ones of the framing options, and
wherein the selection of the one or more of the framing options switches between the different ones of the framing options based on a priority matrix for the framing options, the priority matrix defining priority values for the framing options.

3. The system of claim 2, wherein determination of the framing of the video for presentation based on a selected framing option includes positioning of a viewing window within the field of view of the visual content based on the selected framing option.

4. The system of claim 2, wherein the framing options of different types includes a motion framing option, a tracked object framing option, and a sound direction framing option.

5. The system of claim 4, wherein:

the determination of the framing of the video for presentation based on the motion framing option includes the positioning of the viewing window within the field of view of the visual content based on a direction in which an image capture device that captured the video moved during the capture of the video;

the determination of the framing of the video for presentation based on the tracked object framing option includes the positioning of the viewing within the field of view of the visual content based on depiction of a tracked object within the visual content; and the determination of the framing of the video for presentation based on the sound direction framing option includes the positioning of the viewing within the field of view of the visual content based on a direction from which sound was received by the image capture device during the capture of the video.

6. The system of claim 2, wherein responsive to continuous usage of a given framing option for a threshold duration, the priority values of the priority matrix are dynamically changed.

7. The system of claim 6, wherein the priority values of the priority matrix are dynamically changed to reduce a given priority value of the given framing option.

8. The system of claim 2, wherein one or more parts of the progress length of the video are selected for presentation based on the one or more selected framing options.

9. A method for framing videos, the method performed by a computing system including one or more processors, the method comprising:

obtaining, by the computing system, video information defining a video, the video having a progress length, the video including visual content viewable as a function of progress through the progress length, the visual content having a field of view;

determining, by the computing system, framing options of different types for the video as a function of progress through the progress length, the framing options including a first framing option of a first type and a second framing option of a second type different from the first type;

selecting, by the computing system, one or more of the framing options to frame the video at different moments within the progress length of the video;

determining, by the computing system, framing of the video for presentation based on the one or more selected framing options, wherein selecting the one or more of the framing options to frame the video includes switching between different ones of the framing options, and wherein switching between the different ones of the framing options is performed based on a priority matrix for the framing options, the priority matrix defining priority values for the framing options.

10. The method of claim 9, wherein determining the framing of the video for presentation based on a selected framing option includes positioning of a viewing window within the field of view of the visual content based on the selected framing option.

11. The method of claim 10, wherein the framing options of different types includes a motion framing option, a tracked object framing option, and a sound direction framing option.

12. The method of claim 11, wherein:

determining the framing of the video for presentation based on the motion framing option includes the positioning of the viewing within the field of view of the visual content based on a direction in which an image capture device that captured the video moved during the capture of the video;

determining the framing of the video for presentation based on the tracked object framing option includes the positioning of the viewing within the field of view of the visual content based on depiction of a tracked object within the visual content; and determining the framing of the video for presentation based on the sound direction framing option includes the positioning of the viewing within the field of view of the visual content based on a direction from which sound was received by the image capture device during the capture of the video.

13. The method of claim 9, wherein responsive to continuous usage of a given framing option for a threshold duration, the priority values of the priority matrix are dynamically changed.

14. The method of claim 13, wherein the priority values of the priority matrix are dynamically changed to reduce a given priority value of the given framing option.

15. The method of claim 9, wherein one or more parts of the progress length of the video are selected for presentation based on the one or more selected framing options.

* * * * *